United States Patent Office 3,427,824
Patented Feb. 18, 1969

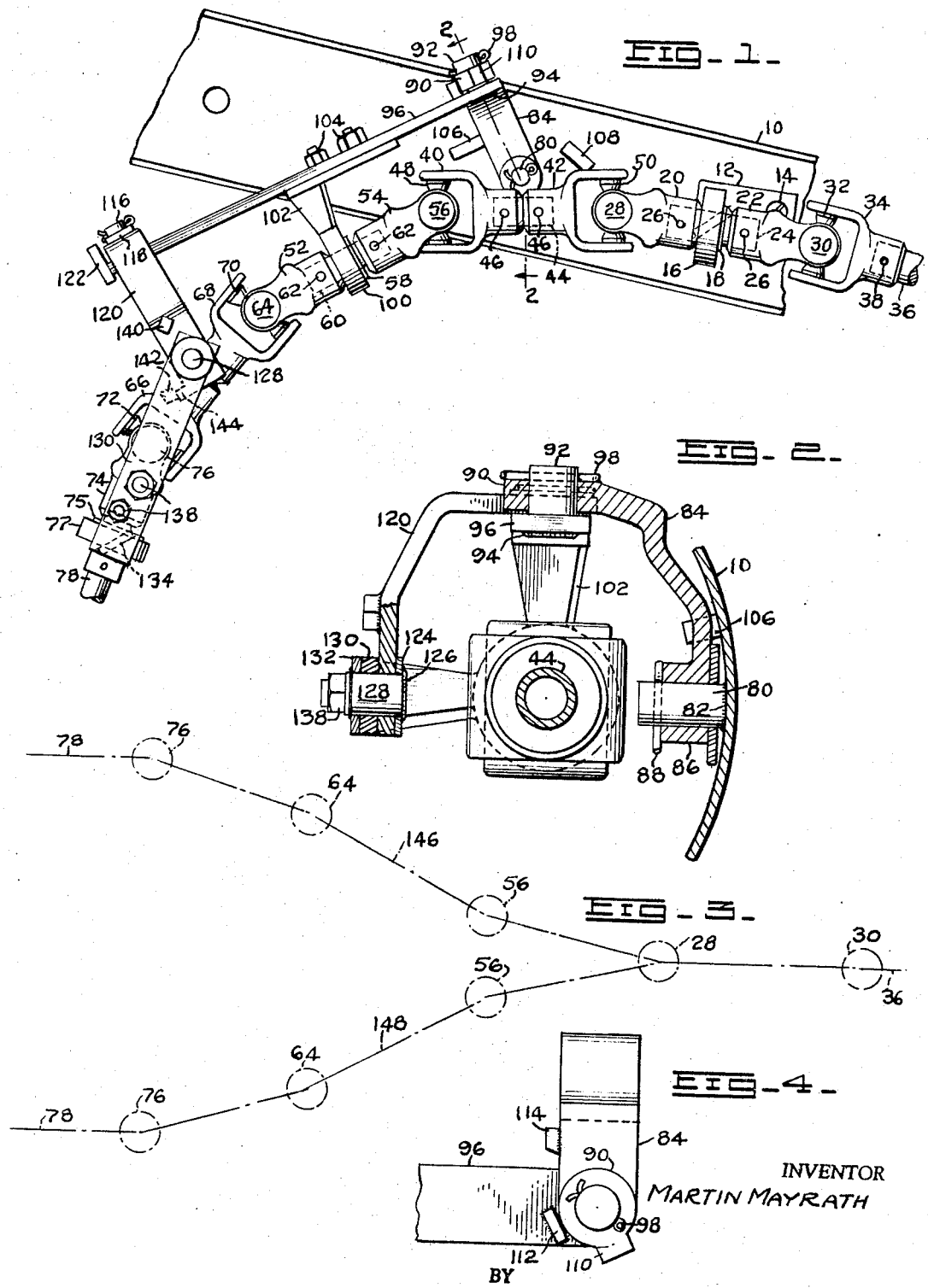

3,427,824
UNIVERSAL JOINT DRIVE CONNECTION FOR LARGE ANGLES OF SHAFT DEVIATION
Martin Mayrath, 10707 Lennox Lane, Dallas, Tex. 75229
Filed Feb. 13, 1967, Ser. No. 615,668
U.S. Cl. 64—2              9 Claims
Int. Cl. F16c 1/04

ABSTRACT OF THE DISCLOSURE

A train of pairs of directly connected Cardan joints having the axis-angulation movements relative to each other controlled by means of pivotal linkage, to prevent excessive angulation of the individual joints and thereby to efficiently transmit power from the inlet end of the train to the outlet end, for all permitted values of total angulation or offset.

Background of the invention

The field of the invention is in the transmission of power through Cardan joints which, as is well known, are limited as to the permitted angulation of the yokes of each joint in order to maintain a relatively high degree of efficiency in power transmission. In the prior art, and where a fixed angle is possible between the input shaft and the output shaft, a series of Cardan joints has been employed, each comprising universally connected elements mounted for rotation on fixed axes. That solution is not capable of use in situations requiring ready adjustment to change the angulation of the input and output shafts, without some means to prevent excessive angulation in the individual joints. A typical field of use in which such lack of control is troublesome is in the day-to-day interconnection of wheeled or portable farm equipment, such as grain loaders or conveyors and the like, or the connection of engines or the like to such equipment.

Summary of the invention

The invention comprises a train of connected pairs of Cardan joint elements, each pair of which has its pintle means at its remote ends for connection with the pintle means of the next adjacent pairs of Cardan joint elements. Mechanical linkage means is also related and connected to the Cardan joints that the center pair of joints, for example, of three such pairs of joints, is caused to assume essentially the same angle with respect to the first and third such pairs, thus eliminating any excessive angularity between the center pair of such three pairs of Cardan joints and either one of the pairs connected thereto. Thus, where power is transmitted through the successive pairs of Cardan joints in the same plane, substantially uniform angularity is maintained between each Cardan joint element and the next adjacent joint element, such angularity being such that power is efficiently transmitted without losses occurring incident to the over-angling of one Cardan joint element relative to the next. Moreover, to prevent over-angulation between the Cardan joints, the linkage means and associated means are provided with elements which serve to limit turning movement of such linkage means and associated means.

Brief description of the drawings

FIGURE 1 is a side elevation of the mechanism shown on a portion of a support with all of the Cardan joints arranged in a single plane;

FIGURE 2 is a section substantially on line 2—2 of FIGURE 1 assuming that the Cardan joints are in alignment with each other;

FIGURE 3 is a diagrammatic view showing different angulations of the Cardan joints possible with the present construction for transmitting power between parallel offset input and output shafts; and FIGURE 4 is a fragmentary plan view of a portion of one of the links and its pivotal supporting means.

Description of the preferred embodiment

Referring to FIGURE 1, the numeral 10 designates a rigid support of any suitable type (which may for instance be a protective guard) having a bracket 12 fixed thereto as at 14 and having an upstanding post 21 on which is secured a bearing 16 whose inner sleeve 18 is carried fixedly on the shaft 24 which in turn rigidly interconnects a pair of Cardan joint elements 20 and 22. These joint elements are thus fixed to each other by means of the short shaft section 24 extending coaxially therethrough and fixed thereto as by drive pins 26. Similar shafts connect the others of the pairs of Cardan joint elements as described below.

The yoke ends of the pair of elements 20 and 22 are provided with the usual pintles 28 and 30 engaging crossed axial pintle bearings of conventional type (not shown). The pintle bearing receiving the pintle 30 also receives the pintles 32 of a Cardan joint yoke element 34, the outer end collar or boss of which is connected to a shaft 36 which may be considered the power input (or output) shaft of the assembly. This shaft is connected to the adjacent element 34 as by a drive pin 38.

To the left of the pair of Cardan joint elements 20 and 22 is arranged another such pair 40 and 42 having their adjacent ends rigidly connected by a shaft 44 (FIGURE 2) also connected to the elements 40 and 42 as by drive pins 46. Since no central bearing is employed for the pair of elements 40 and 42, their adjacent ends may be in abutting relationship, as shown in FIGURE 1. The elements 40 and 42 are respectively provided with pintles 48 and 50 also engaging a conventional crossed pintle bearing therebetween.

Beyond the pair of elements 40 and 42 to the left is another pair of Cardan joint elements 52 and 54, the latter of which has coaxial pintles 56 engaging the pintle bearing for the pintles 48, the pintles of successive joints connected to the same bearing being conventionally crossed or perpendicular to each other. The adjacent ends of the pair of elements 52 and 54 are spaced to provide for a coaxial ring 58, and again the elements 52 and 54 are connected by a coaxial shaft 60 rigidly secured to the elements 52 and 54 by drive pins 62. The joint element 52 at its left end is provided with pintles 64 engaging a conventional pintle bearing therebetween.

Another pair of Cardan joint elements 66 and 68 is arranged beyond the element 52, and this pair of elements has abutting ends, and the elements are secured as before by an axial shaft (not shown) pinned to the respective elements 66 and 68. The joint element 68 is provided with aligned pintles 70 journalled in the same crossed pintle bearing as the pintles 64. The element 66 is also provided with pintles 72 engaging a further pintle bearing therebetween.

Any desired number of pairs of Cardan joint elements may be employed, several of such pairs being shown in FIGURE 1. Beyond the joint element 66 a single joint element 74 is provided, the pintles 76 of which engage the same pintle bearing as the pintles 72. The remote end of the joint element 74 is connected to a shaft 78 which may be the power output (or input) shaft. The joint element 74 carried a ring 75 surrounded by a bearing 77.

Means are provided for controlling the relative angular position of the Cardan joint elements. Referring to FIGURE 2, a stub shaft 80 is welded as at 82 to the support 10, and has its axis substantially intersecting the axis of the element-connecting shaft 44 when the pair of elements 42 and 40 are aligned with the elements 20 and 22. What may be termed a quadrant arm 84 has an inner collar portion 86 (FIGURE 2) mounted on the stub shaft 82 and fixed in position by a cotter pin 88. The upper end of the arm 84 is provided with a collar 90 mounted on a stub shaft 92 extending through and welded as at 94 to a link 96 (FIGURES 1 and 2), and the collar 90 is held on the stub shaft 92 by a cotter pin 98. With the arrangement of parts shown, the arm 84 is adapted to turn on the axis of the stub shaft 80 while the link 96 is free to turn on the axis of the stub shaft 92.

The ring 58 betwen the Cardan joint elements 52 and 54 is surrounded by a bearing 100 similar to the bearing 16. The bearing 100 is carried by a bracket 102 bolted to the link 96 as at 104, and the bearing 100 is in a plane transverse to, and intermediate the ends of, the link 96. The link 96 may be swung by turning the arm 84 on the axis of the stub shaft 80, in which case the bearing 100 will move the Cardan joint elements 52 and 54 downwardly, as shown in FIGURE 1, or upwardly. Such turning movement is limited by securing to the support 10, in the path of travel of the arm 84, a pair of abutments 106 and 108. It will be apparent that when the arm 96 swings downwardly, the bearing 100 moves in an arc of a circle about the axis of the stub shaft 80. This similarly moves the elements 52 and 54, and the downward component of movement occurring at the pintles 56 swings downwardly the adjacent end of the pair of Cardan joint elements 40 and 42. As shown in FIGURE 1, this angles the joint elements 40 and 42 relative to the elements 20 and 22 and angles the elements 52 and 54 relative to the elements 40 and 42. Thus the first two pairs of Cardan elements beyond the element 20 are controlled in their angulation relative to each other and to the elements 20 and 22, and this angulation is maintained within such limits so as to preseve the efficinecy of power transmission through the elements described. Where reference has ben made to downward movement of the elements 52 and 54 and the elements 40 and 42, it will be apparent that the same operation takes place if the link 96 is swung upwardly, such angularity of movement being limited between abutments 106 and 108.

Moreover, the link 96 is not only movable upwardly and downwardly, turning about an axis of the stub shaft 80, but also may be swung toward the observer with the link 96 turning about the axis of the stub shaft 92. This movement also is limited. The collar 90 (FIGURES 1 and 4) is provided with a stop abutment 110 engageable with an abutment 112 on the link 96 to limit downwardly swinging movement of the link 96, as viewed in FIGURE 4. Upwardly swinging movement of the link 96, as viewed in FIGURE 4, is limited by the engagement of such link with a stop abutment 114 welded on the arm 84. Thus any angularity of the Cardan joint elements 52 and 54 relative to the pair of elements 40 and 42 is limited so as to preserve the efficiency of power transmission through these pairs of elements, regardless of the direction change for power transmission.

It is also pointed out that if the link 96 is swung toward the observer in FIGURE 1 about the axis of the stub shaft 92, bodily movement will be imparted to the elements 52 and 54 to move the adjacent element 40 toward the observer, but at a limited angle due to the fact the the pintle 56 is closer to the axis of the stub shaft 92 than is the pintle 64.

The distal end of the link 96 has fixed thereto a stub shaft 116 extending through a collar 118 on the upper end of a second quadrant arm 120 (FIGURES 1 and 2), so that the arm 120 is free to turn on the axis of stub shaft 116. Such movement in either direction is again limited, by a stop abutment 122 on the end of link 96.

At the lower end of the arm 120 (FIGURE 2) is arranged a washer 124 to which is welded as at 126 a stub shaft 128 extending through the arm 120. This stub shaft extends through an arm 130 and through a washer 132 to which the outer end of the shaft 128 is welded. When the axes of all of the Cardan joint elements are aligned, the axis of shaft 128 will approximately intersect the common axis of the Cardan joint elements as indicated in FIGURE 2.

The bearing 77 is carried by a bracket or post 134 to which the distal end of the arm 130 is bolted as at 138. It will be apparent that the distal end of the arm 130 is adapted to turn on the axis of the stub shaft 128, and such turning movement of the arm 130 is limited in one direction by engagement of the arm with an abutment 140 welded to the arm 120. Turning movement of the arm 130 to the angular position shown in FIGURE 1 is limited by the engagement of an abutment 142, welded to the arm 130, with an abutment 144 formed as an extension of the adjacent end of arm 120. When the arm 130 is so turned, the element 74 will have its axis assume the angular position of the arm 130. The pintles 76 will effect movement of the adjacent pair of elements 66 and 68, but to a lesser degree than the arm 130, since the pintles 76 are arranged intermediate the ends of the arm 130. This operation swings the elements 66 and 68 to a predetermined angle relative to the elements 52 and 54, and turns the element 74 and its shaft 78 relative to the axis of the two joint elements 66 and 68. From the foregoing description it will be seen that all of the pairs of Cardan joint elements may be swung to assume relative angulations which are held fairly uniform, and within limits through which the power can be efficiently transmitted. That is, the angulation obtained at any single Cardan joint cannot much exceed the portion represented by the total angulation between input and output, divided by the number of pairs of Cardan joint elements employed.

In addition to the arm 130 swinging about the axis of the stub shaft 128, this arm (together with the arm 120) may be swung about the axis of stub shaft 116. If this action takes place toward or away from the observer looking at FIGURE 1, movement will be transmitted through the pintles 76 to move the adjacent end of the pair of elements 66 and 68 toward and away from the observer, but at an angle smaller than the angle imparted to the arm 130 and shaft 78. This again is due to the transmission of movement from the pintle 76 to the element 66, with such movement applied through the relatively shorter lever arm between the axis of the stub shaft 116 and the pintles 76.

From the foregoing it will be apparent that the present mechanism provides means for transmitting power from an imput shaft to an output shaft through a train of Cardan joint elements so arranged, and with their movement so controlled relative to each other, that the power may be transmitted around a curve generally parallel to the support 10 or perpendicular thereto, or through a combination of both horizontal and vertical movements.

In FIGURE 3 there are diagrammatically suggested the arrangements of the parts by which power may be transmitted between substantially parallel, but offset, input and output shafts in any planes. The successive pintles 30, 28, 56, 64 and 76 have been indicated in broken circular lines in FIGURE 3 with the lines (directions) of power transmission being shown substantially as compound curves between the input and output shafts. The upper line of power transmission in FIGURE 3, indicated by numeral 146, leads to the shaft 78 which is above and parallel to the shaft 30, while the (alternative) lower transmission line 148 leads to the output shaft 78 now below, but parallel to, the input shaft 36. The use of the assembly of elements according to the invention is hence highly flexible, and is capable of delivering power around a regular curve or over offsets, or compound curves, without the user (who needs to control only the ultimate relation of the input and output ends) having to concern himself with the proper distribution of the total angularity, or offset, amongst the several sets of joints. In this way, any concentration of angularity in a single Cardan joint is automatically prevented, so that the over-all efficiency of power transmission is maintained, and so that the assembly can transmit a maximum torque or power at the desired speed.

The invention has been disclosed herein by means of a particularly open and self-demonstrating construction using links spaced from the line or axis of power transmission, these links and quadrants forming a sort of open "cage" partially surrounding the power axis, as apparent from FIGURE 2. It will be noted, in this connection, that the portion of the rigid support or guard 10 that connects the stub shaft 80 and the anchor point at 12, 14 also acts as an end one of the links of this linkage. Insofar as the geometry of the assembly is concerned, it will be apparent to those skilled in mechanics that the same result (automatic distribution of angulation over several universal joints in a train thereof) can be achieved by more compact, but less visible, equivalents of these open links and quadrants.

What is claimed is:

1. A power transmitting means for connecting a driving shaft and a driven shaft which are subject to variable angulation of their axes, comprising a train of Cardan joints including joint elements arranged in connected pairs, a support, and control means connected to at least certain of said Cardan joint elements for controlling the relative angulation between adjacent Cardan joints to maintain uniform joint angulation throughout said train; said control means comprising a link, means connecting said link at one end relative to said support for turning movement about two perpendicular axes, one of which intersects the axis of a first pair of said joint elements, a bearing carried by said link intermediate its ends and rotatably supporting a second pair of joint elements, and means having mechanical connection with the other end of said link for controlling a third pair of said joint elements, having universal connection with said second pair of joint elements, whereby, when said third pair of joint elements is angled relative to said first pair of joint elements, said bearing will bodily control the position of said second pair of joint elements to cause it to assume a position relatively equally-angled with respect to said first and third pairs of joint elements.

2. A power transmitting means according to claim 1 wherein said means for connecting one end of said link to said support comprises a quadrant arm pivotally connected at one end to said support for turning movement on an axis substantially perpendicular to the axis of the first pair of joint elements, the turning of said link on said axis which intersects the axis of said first pair of joint elements being about a stub shaft connecting said one end of said link to the other end of said quadrant arm.

3. A power transmitting means according to claim 2 provided with means for limiting pivotal movement of said quadrant arm relative to said support, and means for limiting turning movement of said link about the axis of said stub shaft.

4. A power transmitting connection according to claim 1 wherein said means having mechanical connection with the other end of said link comprises a second stub shaft carried by said other end of said link and having its axis parallel to the axis of said first-named stub shaft and intersecting the axis of said third pair of joint elements, a quadrant arm having one end connected for turning movement on said second stub shaft, and means for effecting angular movement of said third pair of joint elements comprising a pivotal connection for the other end of said quadrant arm.

5. A power transmitting means according to claim 4 comprising a single joint element universally connected to the end of said third pair of joint elements remote from said second pair of joint elements, said pivotal connection for the other end of said quadrant arm having its axis fixed with respect to said single joint element.

6. A power transmitting means according to claim 5 provided with an arm fixed at one end to said single joint element and having its other end terminating intermediate said third pair of joint elements, said pivotal connection for said other end of said quadrant arm being connected to said last-named arm.

7. An adjustable power transmitting connection for connecting a driving shaft and a driven shaft which may be subjected to extremes of relative angulation or offset of their axes, comprising a plurality of at least four interconnected Cardan joints, respective shaft bearings disposed between and supporting for rotation alternate pairs of adjacent Cardan joints, and a series of interconnected links supporting said respective bearings, said links being pivoted to one another on axes which intersect the lines of connections between the intervening pairs of Cardan joints; at least two non-adjacent links being shaped as quadrants generally concentric with the power drive axis.

8. A power transmitting connection in accordance with claim 7, and stop means on said links for restricting the relative angulation thereof, and thereby of the angulation of successive pairs of said Cardan joints, to values compatible with efficient power transfer.

9. A power transmitting connection in accordance with claim 7, in which an end one of said links forms a structurally integral part of a frame member which is stationary relative to the axis of one of said shafts.

References Cited

UNITED STATES PATENTS

| | | | |
|---|---|---|---|
| 1,892,108 | 12/1932 | Johnson | 64—1 |
| 2,030,511 | 2/1936 | Gruber | 64—1 |
| 2,501,217 | 3/1950 | Hawn | 64—2 |

HALL C. COE, *Primary Examiner.*